(12) United States Patent  
Labrie

(10) Patent No.: US 8,025,570 B2  
(45) Date of Patent: Sep. 27, 2011

(54) MASSIVELY MULTIPLAYER GAME METHOD AND SYSTEM

(76) Inventor: Jon Edgar Labrie, Hermosa Beach, CA (US)

( * ) Notice: Subject to any disclaimer, the term of this patent is extended or adjusted under 35 U.S.C. 154(b) by 1387 days.

(21) Appl. No.: 10/545,620

(22) PCT Filed: Feb. 23, 2004

(86) PCT No.: PCT/NZ2004/000034  
§ 371 (c)(1), (2), (4) Date: Oct. 10, 2006

(87) PCT Pub. No.: WO2004/075091  
PCT Pub. Date: Sep. 2, 2004

(65) Prior Publication Data  
US 2007/0032298 A1 Feb. 8, 2007

(30) Foreign Application Priority Data  
Feb. 24, 2003 (NZ) ........................ 524409

(51) Int. Cl.  
*A63F 9/24* (2006.01)  
*A63F 13/00* (2006.01)  
*G06F 17/00* (2006.01)  
*G06F 19/00* (2006.01)

(52) U.S. Cl. ........................................ 463/42

(58) Field of Classification Search .............. 463/2, 16, 463/36, 37, 42  
See application file for complete search history.

(56) References Cited

U.S. PATENT DOCUMENTS 6,179,713 B1 1/2001 James et al.  
2005/0266925 A1* 12/2005 Hornell et al. ................. 463/42

OTHER PUBLICATIONS http://en.academic.ru/dic.nsf/enwiki/243880 Feb. 2010.*

* cited by examiner

*Primary Examiner* — David L Lewis  
*Assistant Examiner* — Reginald A Renwick  
(74) *Attorney, Agent, or Firm* — Brinks Hofer Gilson & Lione

(57) ABSTRACT

The invention describes a method of implementing a massively multiplayer game. The method has the following steps: firstly, three or more players select an item from an ordered set of three or more items. Secondly, an item from the set is designated based on the number of players who selected that item. Lastly, whether each player's selected item wins over the designated item is determined based on a rule-set (examples of rule-sets are given in FIGS. 3 and 4). The method may be implemented using a client/server architecture such as that shown in FIG. 5. Alternatively, the server may be decentralized across all the devices such as shown in FIG. 6. The client devices may be wireless devices. A system and software for implementing the method are also disclosed.

9 Claims, 4 Drawing Sheets

MASSIVELY MULTIPLAYER GAME METHOD AND SYSTEM

FIELD OF INVENTION

The present invention relates to a method and system for a massively multiplayer game. More particularly, but not exclusively, the present invention relates to a method for a massively multiplayer game where the players select an item from a set of items.

BACKGROUND TO THE INVENTION

There are numerous multiplayer games available. These include games playable over the Internet, over Interactive TV, and over cellular networks. Presently the cost-per-packet of sending information over cellular networks is comparatively high. This necessitates the development of multiplayer games which can draw in and engage players but transmit little data to and from the cellular devices.

What is further desired is a multiplayer game concept which can be deployed across multiple platforms, protocols, and channels such as SMS (Short Message Service on wireless devices), WAP (Wireless Application Protocol on wireless devices), MMS (Multimedia Message Service on wireless devices), Flash, Java, Brew, Interactive TV, and Web.

It is an object of the present invention to provide a multiplayer method and system which satisfies these requirements or at least provides the public with a useful choice.

SUMMARY OF THE INVENTION

According to a first aspect of the invention there is provided a method of implementing a massively multiplayer game including the steps of:
  i. three or more players selecting an item from an ordered set of three or more items;
  ii. designating an item from the set based on the number of players who selected that item; and
  iii. determining whether each player's selected item wins over the designated item based on a rule-set.

In a preferred embodiment, the set of items is composed of three items. Preferably these are rock, scissors, and paper, but may also be colours, such as red, green, and blue. The set of items may also be the five Chinese elements: fire, earth, metal, water, and wood.

The designated item may be the item which was selected by the majority of players.

The rule-set may be the traditional "rock, scissors, paper" rule-set, where rock wins over scissors, scissors wins over paper, and paper wins over rock. The "rock, scissors, paper" rule-set may be applied to larger sets of items for example, with water, fire, metal, wood and earth, water wins over fire, fire wins over metal, metal wins over wood, wood wins over earth, and earth wins over water. Alternatively, larger sets may involve more complex rule-sets, for example: water wins over fire and metal; fire wins over metal and wood; metal wins over wood and earth; wood wins over earth and water, and earth wins over water and fire.

Preferably, the rule-set is symmetrical such that every item wins over the same number of other items. For example: in a five item set, every item winning over two other items. Preferably, the number of items within the set is odd.

In a preferred embodiment, the method may include the steps of:
  iv. determining whether each player's selected item wins over the remaining items in the set based on the rule-set; and
  v. allocating points to each player based on the determinations in steps (iii) and (iv).

Preferably, if a player's selected item wins over the designated item the player is provided with points, if a player's selected item is the designated item the player may lose points or no points may be awarded, if the player's selected item is beaten by the designated item then that player may lose points, and if the player's selected item is neither beaten by nor wins over the designated item then that player may lose points or no points may be awarded.

According to a second aspect of the invention there is provided a method of implementing a multiplayer game including the steps of:
  i. selecting an item from a set of items by three or more players on three or more respective devices;
  ii. each device transmitting the player's selected item to a server;
  iii. the server designating an item based on all the selected items received;
  iv. the server determining whether each player's selected item wins over the designated item based on a rule-set;
  v. the server transmitting the result of each determination to its respective device;

The devices may be wireless devices such as cellular phones, or internet-capable computers or Interactive Televisions.

The server may be a system comprising a plurality of edge server devices connected to a central core server device. Alternatively, the server may be a single computer system. Alternatively, the server may be one of the players' devices. Alternatively, the server may be decentralised and distributed across all of the players' devices, so that each device is the server.

To select the item, players may use an application operating on their device without communication to the server. The application may involve skill or chance. The conclusion of the application resulting in the selected item. In addition to transmitting the selected item to the server, the device may also transmit directions from the player. As well as determining whether the player wins over the designated item, the server may use the selected item and directions within a persistent game world common to all the players.

According to a third aspect of the invention there is provided a system for implementing a multiplayer game including:
  i. a plurality of devices;
  ii. a server;
  iii. each device responsive to user interaction to select an item from a set of items, and with the ability to transmit item selection to a server and receive result data from the server, and
  iv. the server containing a messaging application with the ability to receive item selection from devices and transmit result data to devices, and a processing application with the ability to designate an item from the set of items based on the selected items received, determine whether each selected item wins over the designated item based on a rule-set, and send this determination as result data to the messaging application to transmit to the selected item's respective device.

Preferably, the result data transmitted by the server to the devices is transmitted as a single packet (typically 128 bytes).

Preferably, excess space within the packet is utilised by the server to include additional information or promotional messages.

BRIEF DESCRIPTION OF THE DRAWINGS

The invention will now be described by way of example with reference to the accompanying drawings in which.

DETAILED DESCRIPTION OF PREFERRED EMBODIMENTS

The present invention relates to a method and system for providing a massively multiplayer game. The method involves the selection of an item by each player from a set of items and determining which players have "won" by comparing their selection with the majority selection.

Description of a First Possible Implementation of the Method

The invention provides a method for ranking game-play choices of 3 or more players based on the choice made by the majority of players. An object of one implementation of the invention is for the player to 'defeat' the choice made by the majority of players.

Consider the example of 3 potential player choices A, B, and C, where the rule-set provides that:

A defeats B;
B defeats C; and
C defeats A

Three or more individual players will each choose one of these options and their choices will be totaled. The option chosen by the majority of players is called the 'Majority' throw. If there is no Majority then the round is a draw for all players, and a new round begins.

Individual choices are compared against the Majority throw. Those players who have chosen the single option that defeats the Majority throw have won the round, those who chose the same as the Majority are declared to have a draw, and those who chose the option defeated by the Majority are considered to have lost the round.

Figure 1:
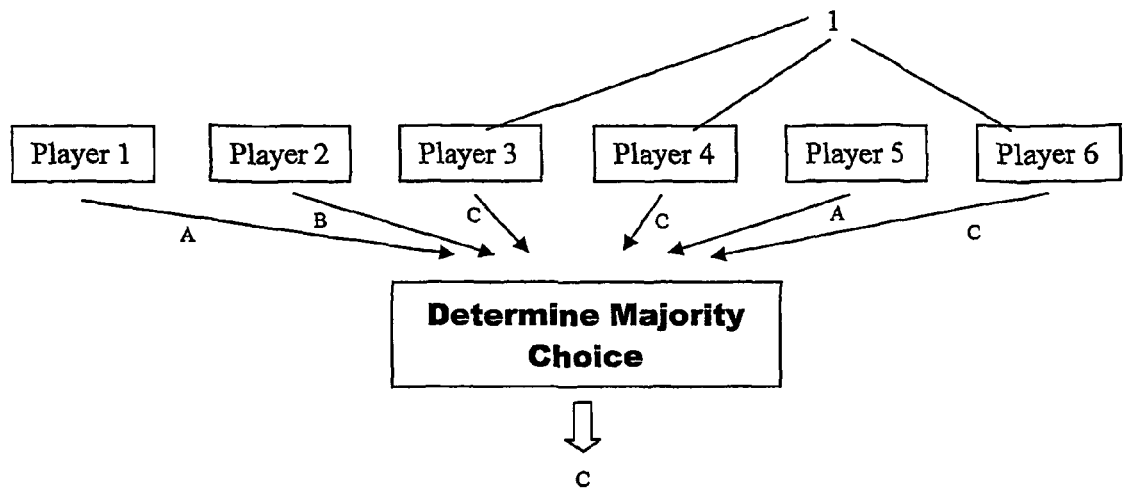
FIG. 1: shows a diagram illustrating an example of a round in game-play.

FIG. 1 shows an example of a round played by 6 players with the above conditions. In this round a majority 1 of players have chosen "C". Therefore Player 2 has won. Players 3, 4, and 6 are drawn, and Players 1 and 5 have lost the round.

Description of a Second Possible Implementation of the Method

Figure 2:
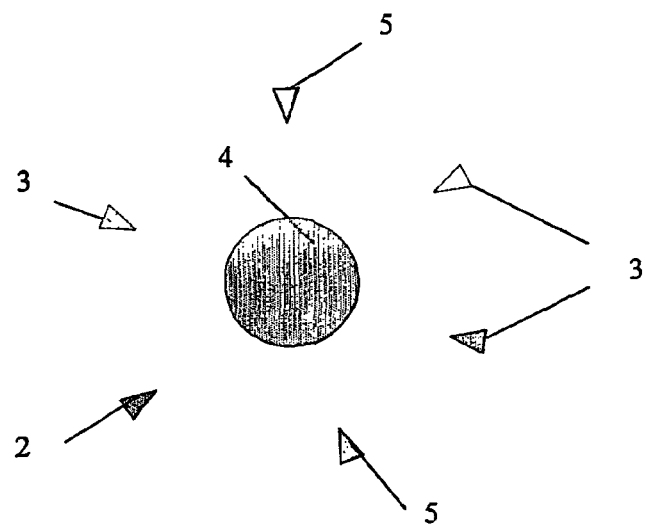
FIG. 2: shows a screenshot of one implementation of the method.

FIG. 2 shows a screen-shot of one implementation of the method.

In this implementation players are provided with three possible choices, this time of color Red 2, Blue 3, and Green 5.

Red defeats Green;
Green defeats Blue;
Blue defeats Red.

Players use a device or plurality of devices, each of which displays a playing area. The centre of the area is a geometric shape or icon 4 that has as it primary purpose the display of the majority colour; that is the colour currently chosen by the majority of players during game-play. In FIG. 2 the shape is a circle.

Players are each assigned a play token 2 3 5 represented by an appropriate shape or icon. The purpose of the icon is twofold—first, to display the colour currently chosen by a given player, and second, to indicate the player's position with respect to other players and the centre circle.

Players start from positions equidistant from the outer edge of the circle. When play begins each player separately chooses a colour for the opening round, and the icon 2 3 5 representing that player takes on that colour. The central circle 4 takes on the colour the majority 3 has chosen; if there is currently no majority its status remains unchanged.

If the colour chosen by the player wins over the colour currently in the centre, the player advances one unit towards the centre. If it matches the colour, the player remains at rest, and if his colour is beaten by the centre colour, the player retreats one unit away from the centre.

Play proceeds on a round by round basis until either all players have been eliminated by disappearing from the field of play, or one or more players have reached the centre circle.

A player may choose a new colour during any round, with the exception that any new colour choice persists for at least two rounds of play.

Possible Rule-Sets

Preferably, the rule-set has a rule such that every item wins over the same number of items bringing symmetry to the game.

Figure 3:
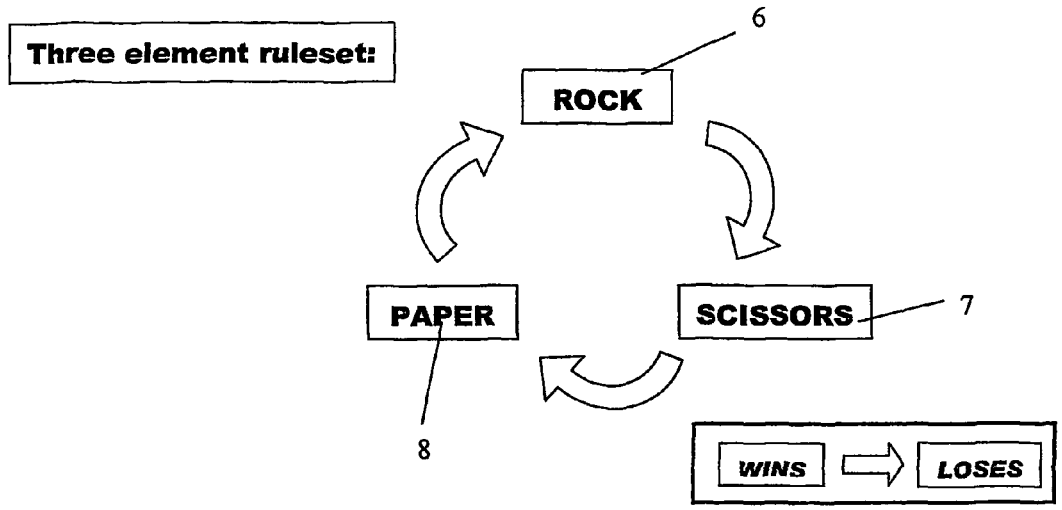
FIG. 3: shows a diagram illustrating an example of a rule-set.

With reference to FIG. 3, an example of a rule-set will be described:

rock 6 wins over scissors 7, scissors 7 wins over paper 8, and paper 8 wins over rock 6.

This rule-set can be described as a rule such that for an ordered set of items $\{X_1 \ldots X_n\}$, in this example {rock, scissors, paper}, $X_k$ wins over $X_{k+1}$ and $X_n$ wins over $X_1$ for all k where k is some integer such that $0<k<n$.

This rule-set with different elements is the rule-set used in the first two descriptions given.

Figure 4:
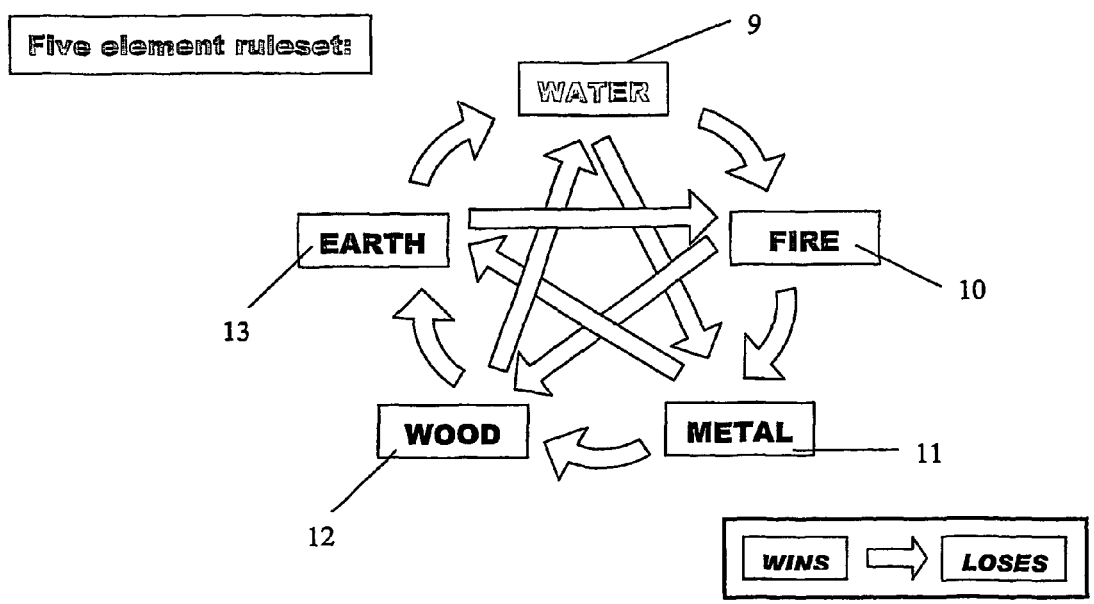
FIG. 4: shows a diagram illustrating an example of a rule-set.

With reference to FIG. 4, an example of a rule-set will be described:

water 9 wins over fire 10 and metal 11; fire 10 wins over metal 11 and wood 12; metal 11 wins over wood 12 and earth 13; wood 12 wins over earth 13 and water 9; and earth 13 wins over water 9 and fire 10.

The above rule-set can be described as a rule such that for an ordered set of items $\{X_1 \ldots X_n\}$, in this example {water, fire, metal, wood, earth}, $X_k$ wins over $X_{(k+p)\ modulo\ n}$ for all k and all p where k is some integer such that $0<k<(n+1)$ and where p is some integer such that $0<p<(^{n+1}/_2)$. So in this example k will be 1, 2, 3, 4 and 5, and p will be 1 and 2. When k is 4 and p is 1 the function ((k+p) modulo n) will result in 5. When k is 5 and p is 1 the function ((k+p) modulo n) will result in 1.

Overview of Game-Play (Server/Client Model)

Figure 5:
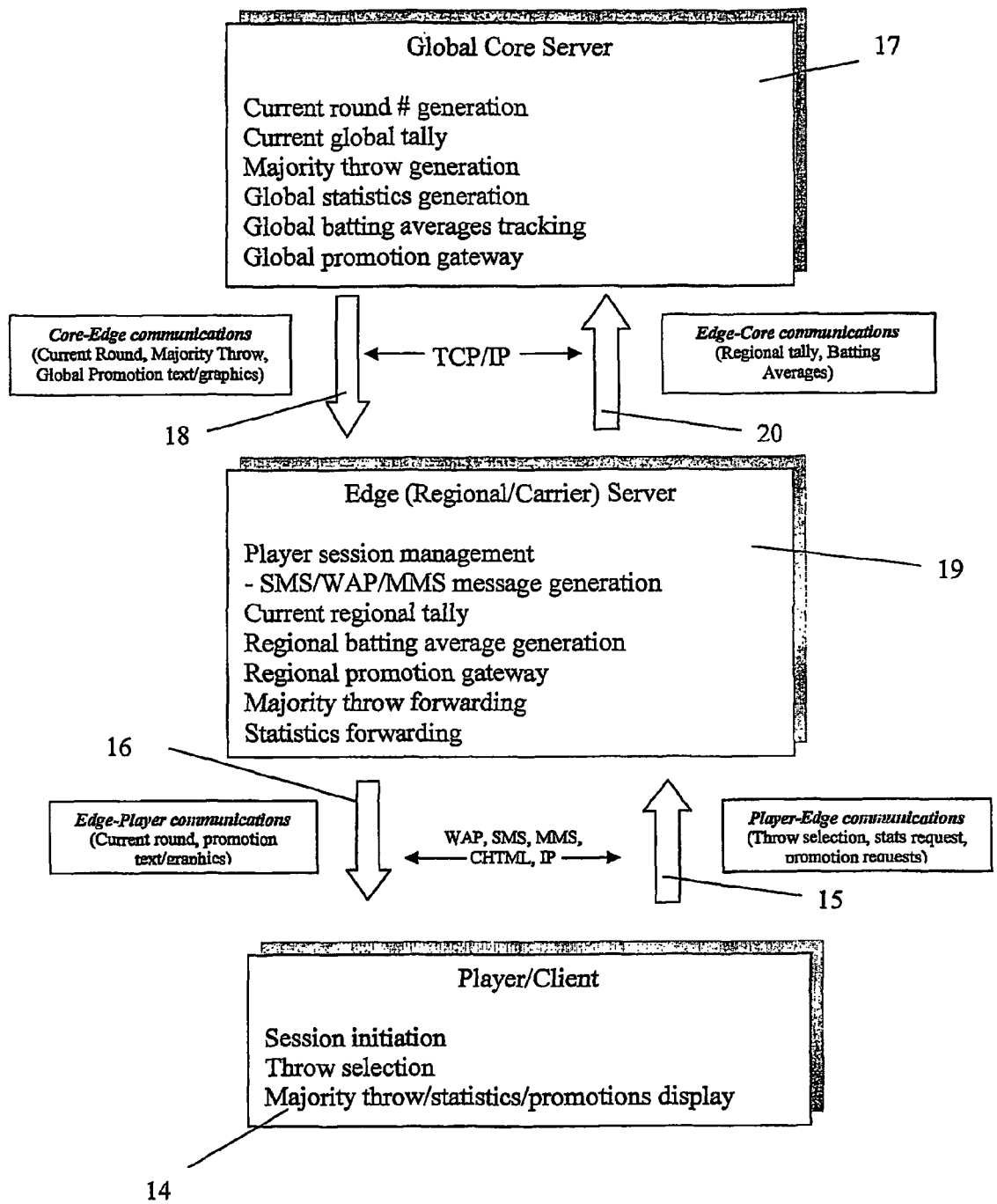
FIG. 5: shows an example of how the method may be deployed onto hardware.

With reference to FIG. 5, a description of how the method operates on hardware using the server/client model will be given.

Wired/Wireless Client/Player View

Beginning play: Potential SMS players 14 initiate a session by sending 15 a throw message (rock, paper, or scissors) to a specific network location. Potential WAP players navigate to the appropriate WAP page using the menu structures available on their device, are presented with a throw selection dialog, and choose a throw.

Round enrollment: All players receive 16 a message with notification of the current round number, approximate time to round completion, and current number of players in round. Depending on level of ongoing player status (casual, subscriber, sponsored) additional promotional messages or game statistics may be forwarded or made available.

Round completion: All players receive a final message with notification of final throw as determined by a Global Core Server 17. Depending of level of ongoing player status (casual, subscriber, sponsored) additional promotional messages or game statistics may be forwarded or made available.

Server View

Beginning play: The Global Core Server 17 generates a new, unique numerical identifier for the current round at predetermined intervals—for example, every 30 seconds—and forwards 18 the identifier, a round expiration timestamp, and any unique promotional or statistics messages to Edge Servers 19.

Round enrollment: Upon receipt 18 of the new identifier and timestamp, Edge Servers 19 process pending and new requests for enrollment, and notify 16 players of round enrollment, expiration status, and any appropriate promotional or statistical messages based on player status. Edge Servers 19 aggregate player throws and forward 20 totals to the Global Core Server 17.

Round completion: Upon reaching the time indicated in the expiration timestamp, the Global Core Server 17 sends 18 round closure notification to Edge Servers 19, totals player throws, and sends 18 majority throw message to Edge Servers 19. Edge Servers 19 format and send 16 majority throw messages (which could be in SMS or MMS format), including appropriate promotional or statistics messages, to players enrolled in round.

Overview of Game-Play (Distributed Processing Model)

Figure 6:
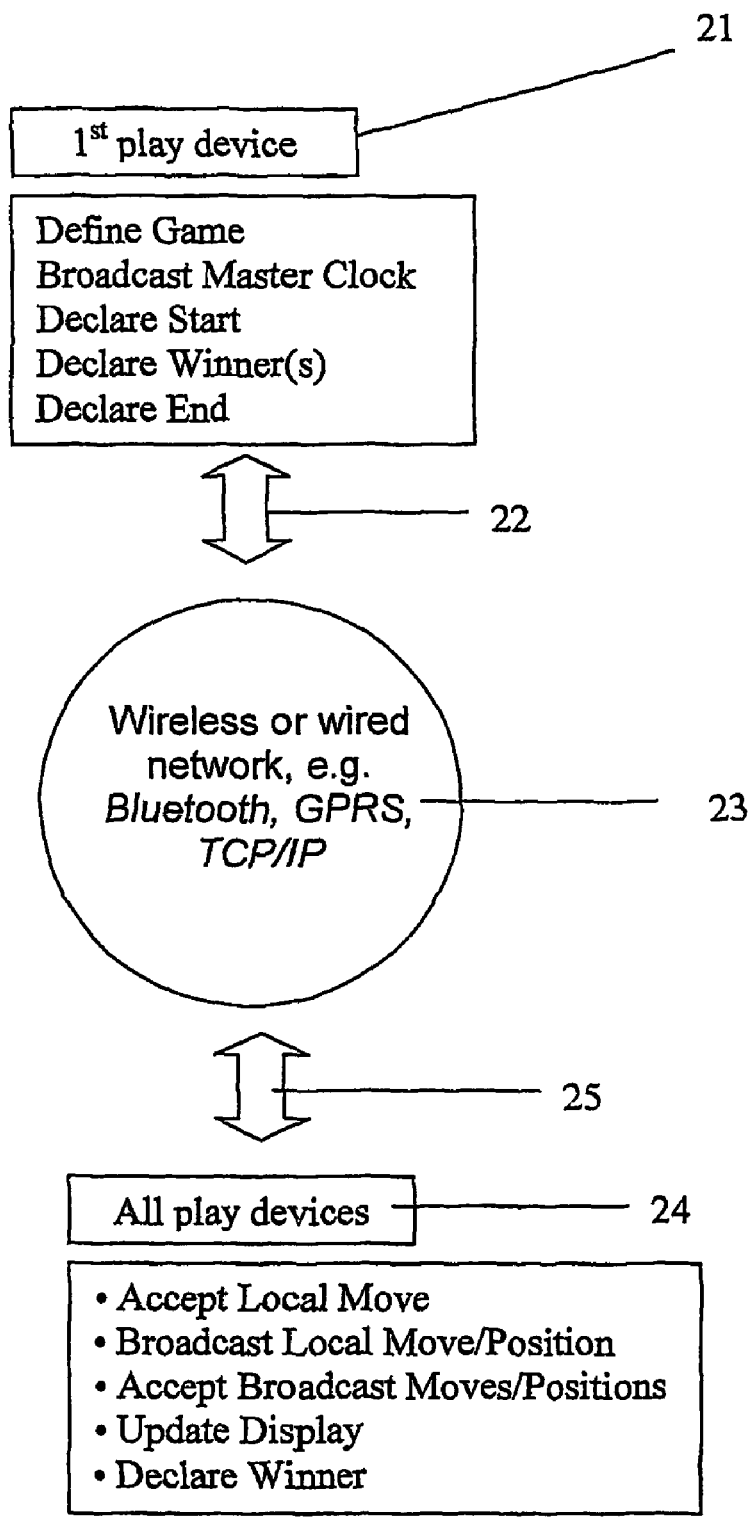
FIG. 6: shows another example of how the method may be deployed onto hardware.

With reference to FIG. 6, a description of how the method operates on hardware using the distributed processing model will be given.

A single device 21—the 1st play device, defines a game session by broadcasting 22 a session name chosen by the 1st player at regular intervals via an established wired or wireless network transport and protocol 23 with extensions to support discovery of additional play devices. A plurality of additional play devices 24 initiate connection to all known play devices via the network 23.

When all devices 21 24 have successfully established connections, the 1st play device 21 sends 22 a start command to all devices 21 24, and begins broadcast 22 of a master clock pulse at an established, regular interval.

For each round of play, players choose from available play options—e.g. red, green, or blue—and their choices are broadcast 22 25 to all known devices 21 24. When all devices 21 24 have acknowledged receipt of every player choice, or time has expired as determined by the master clock, local displays are updated by the local application. The local application checks to see if the local player or any others have won—e.g. by reaching the center objective, and if so declares a win. The 1st play device 21 verifies any declared winners with one or more peers, and if there is agreement, declares final Winners, and ends the game. If there is no winner on the current round, a new round begins.

One of the advantages of the invention is that the game method provided is engaging as individual players are, in effect, trying to beat the majority, the zeitgeist, the collective unconscious.

Further, only single packets need travel in each direction to carry the player's throw and the server's response. A wireless packet is typically 128 bytes (1024 bits), yet only 2 bits are necessary to carry game-play information. Everything else—1022 bits—is available for other uses. This is especially significant in the server to client communications, because it allows the server to send text, objects, or even animation updates to the client application. The more a player wins, the more small objects or behaviours they can collect for that day.

A further advantage is it would typically cost less than 1 yen per throw to play, effectively removing the financial barrier. Players can enter or leave at any time. Continued play is rewarded with small digital collectable objects, and if the game is successful there might be an opportunity to upgrade to more substantial prizes—a free soft drink or a new graphic to download for 5 straight wins.

In addition, the application is simple and inexpensive to code and implement.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details representative apparatus and method, and illustrative examples shown and described. Accordingly, departures may be made from such details without departure from the spirit or scope of applicant's general inventive concept.

The invention claimed is:

1. A method of implementing a multiplayer game including the steps of:
   i. selecting an item from a set of items by three or more players on three or more respective devices;
   ii. each device transmitting the player's selected item to a server;
   iii. the server designating an item based on all the selected items received;
   iv. the server determining whether each player's selected item wins over the designated item based on a rule-set;
   v. the server transmitting the result of each determination to its respective device;
      wherein the rule-set includes a rule such that for an ordered set of items $\{X1 \ldots Xn\}$, $Xk$ wins over $X(k+p)$ modulo n for all k and all p where k is some integer such that $0<k<(n+1)$ and where p is some integer such that $0<p<(n+\frac{1}{2})$; and
      wherein the designated item is the item selected by a majority of players.

2. A method as claimed in claim 1 wherein there are an odd number of items within the set.

3. A method as claimed in claim 1 including the steps of:
   vi. the server determining whether each player's selected item wins over the remaining items in the set based on the rule-set; and
   vii. the server allocating points to each player based on the determinations in steps (iv) and (vi).

4. A method as claimed in claim 1 wherein the devices are any of wireless devices, Internet-capable personal computers, or Interactive televisions.

5. A method as claimed in claim 1 wherein the client and the server communicate using one of the set of Wireless Application Protocol, Multimedia Message Service and Short Message Service.

6. A system for implementing a multiplayer game including:
   i. a plurality of devices;
   ii. a server;

iii. each device responsive to user interaction to select an item from a set of items, and with the ability to transmit item selection to a server and receive result data from the server; and iv. the server containing a messaging application with the ability to receive item selection from devices and transmit result data to devices, and a processing application with the ability to designate an item from the set of items based on the selected items received, determine whether each selected item wins over the designated item based on a rule-set, and send this determination as result data to the messaging application to transmit to the selected item's respective device wherein the rule-set includes a rule such that for an ordered set of items $\{X_1 \ldots X_n\}$, $X_k$ wins over $X_{(k+p)}$ modulo $n$ for all $k$ and all $p$ where $k$ is some integer such that $0 < k < (n+1)$ and where $p$ is some integer such that $0 < p < (n+\frac{1}{2})$; and wherein the designated item is the item selected by a majority of players.

7. A system as claimed in claim 6 wherein the devices are wireless devices.

8. A system as claimed in claim 7 wherein the result data is transmitted as a single packet.

9. A system as claimed in claim 8 wherein the processing application inserts a promotional message in the single packet for the result data.

* * * * *